H. H. LOTT.
JEWELRY.
APPLICATION FILED OCT. 14, 1915.
1,183,017.
Patented May 16, 1916.
2 SHEETS—SHEET 1.
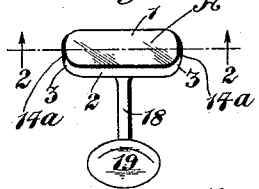
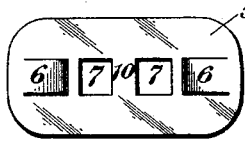
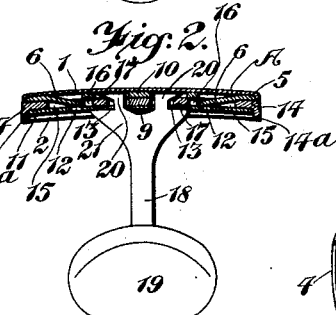
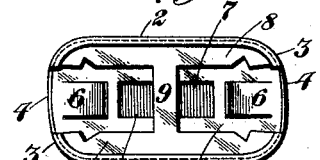
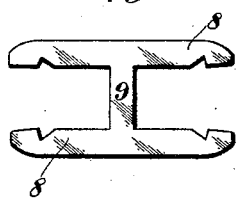
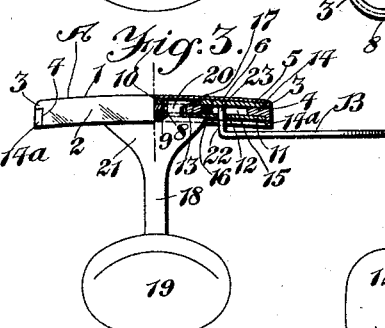
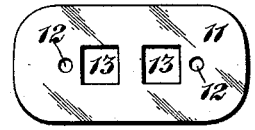
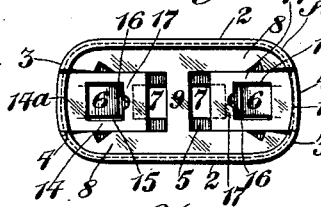
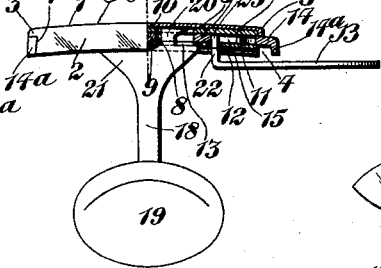
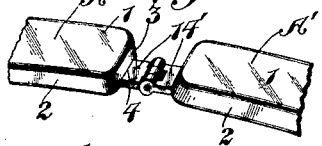
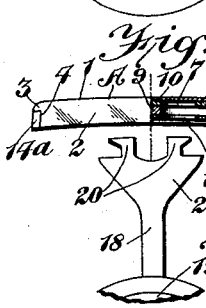
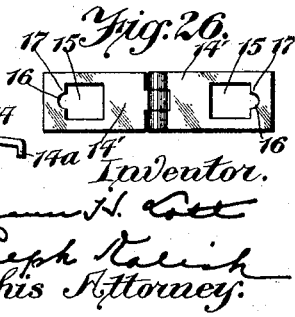
Attest:
Charles A. Becker.
Inventor.
Herman H. Lott
by Ralph Kalish
his Attorney.

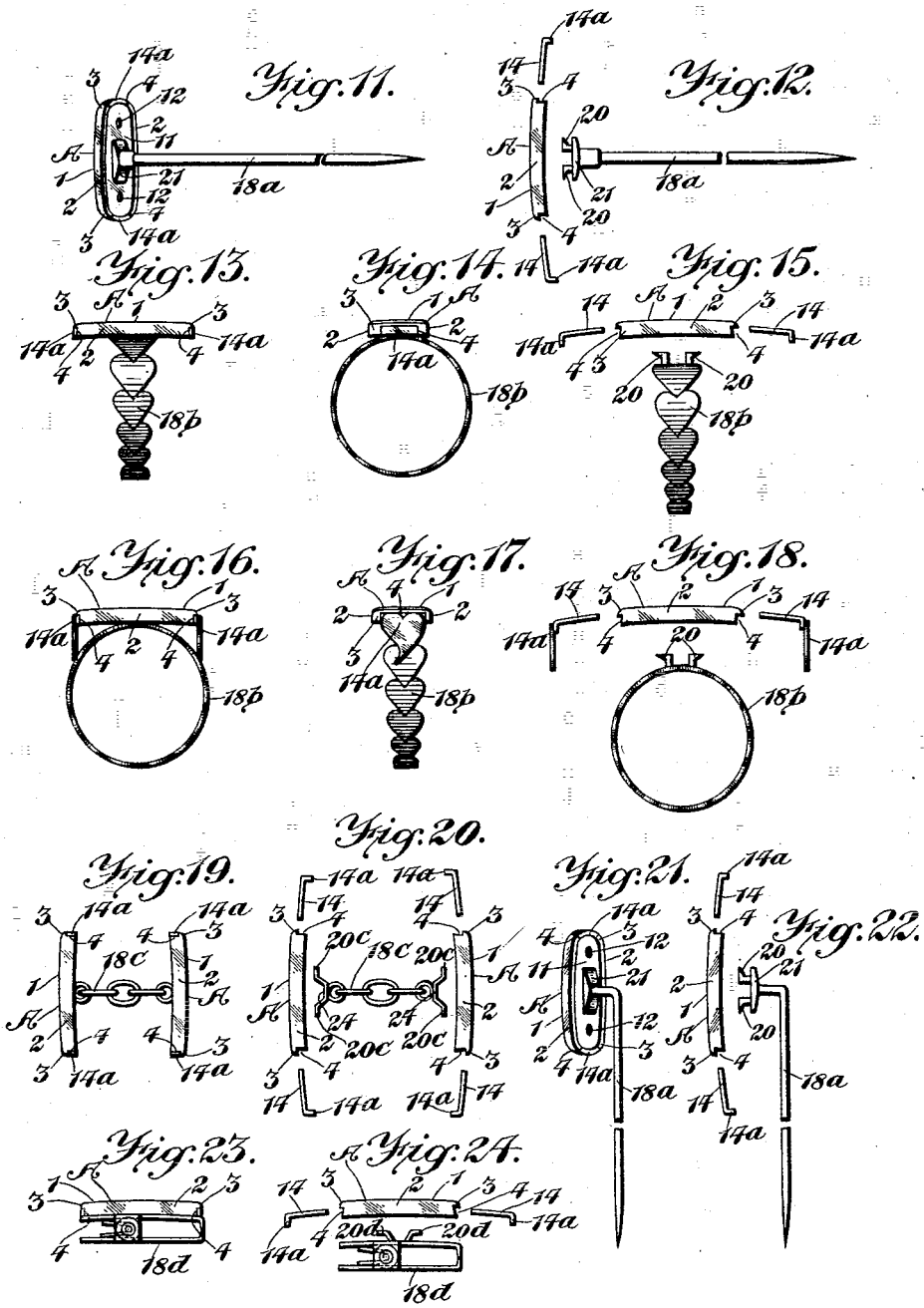

UNITED STATES PATENT OFFICE.

HERMANN H. LOTT, OF ST. LOUIS, MISSOURI.

JEWELRY.

1,183,017. Specification of Letters Patent. Patented May 16, 1916.

Application filed October 14, 1915. Serial No. 55,910.

*To all whom it may concern:*

Be it known that I, HERMANN H. LOTT, a citizen of the United States, residing at the city of St. Louis, State of Missouri, have invented certain new and useful Jewelry, of which the following is a specification, reference being had to the accompanying drawings, forming a part thereof.

This invention relates generally to certain new and useful jewelry and, more particularly, to what I may call an interchangeable head for jewelry, articles of various kinds, such, for instance, as link and bar cuff-buttons, hat and scarf-pins, bracelet-links, clasps, and the like, the principal object of my present invention being to provide a jewelry-piece adapted to be used with the suitable shanks or body-portions of articles such as the kind stated to interchangeably provide a so-called head therefor, the several parts being of comparatively simple and inexpensive construction and in each instance not only being readily and conviently operatively detachably fastened together to form the completed article, but also presenting a neat, pleasing, and attractive appearance.

With the above and other objects in view, my present invention resides in certain novel features of form, construction, arrangement, and combination of parts, all as will hereinafter be described and afterward pointed out in the claims.

In the accompanying drawings, which show in preferred form several different kinds of jewelry articles,—Figure 1 is an elevational view of a bar cuff-button embodying my invention; Fig. 2 is a similar somewhat enlarged view of the same with the head thereof in longitudinal section on approximately the line 2—2, Fig. 1. Figs. 3, 4, and 5 are also similar somewhat enlarged views of the same with the head thereof partly in longitudinal section, showing, respectively, one of the locking-springs depressed preparatory to disengaging the head from the shank, one of the locking-springs depressed and one of the locking members partly removed or pulled from the head as in disengaging the head from the shank, and one of the locking-members entirely removed or pulled from the head and the head and shank disengaged; Figs. 6 and 7 are plan views of, respectively, the spring-plate and guide-forming members of the head; Fig. 8 is an inverted plan view of the head with the outer plate thereof removed; Fig. 9 is a similar view of the head, showing the shank-locking members in operative locking position therein; Fig. 10 is a plan view of the outer plate of the head; Figs. 11 and 12 show in elevation a hat-pin embodying my invention, the parts thereof being shown, respectively, assembled and disassembled; Figs. 13 and 14 are end and side views, respectively, of a ring embodying my invention; Fig. 15 is also an end view of the ring of Figs. 13 and 14 with the parts thereof disengaged and in assembling position; Figs. 16 and 17 are side and end views, respectively, of another form of ring embodying my invention; Fig. 18 is also a side view of the ring of Figs 16 and 17 with the parts thereof disengaged and in assembling position; Figs. 19 and 20 show in side elevation a link cuff-button embodying my invention, the parts thereof being shown, respectively, fully assembled and in disengaged, assembling position; Figs. 21 and 22 show in side elevation a scarf-pin embodying my invention, the parts thereof being similarly shown, respectively, in fully assembled and in disengaged, assembling position; Figs. 23 and 24 show in side elevation a clasp embodying my invention, the parts thereof being also shown, respectively, in fully assembled and in disengaged assembling position; Fig. 25 is a fragmentary view of a pair of bracelet-links embodying my invention; Fig. 26 is a plan view of the double locking or connecting member usable with the links of Fig. 25; and Fig. 27 is a plan view of the tool preferably employed by me in disengaging or detaching the head and shank one from the other, a side elevation of this tool in operation being shown in Fig. 4.

Referring to the said drawings, in which like reference characters refer to like parts throughout the several views, A indicates my new interchangeable jewelry head, which is preferably approximately rectangular in shape and slightly curved or arched longitudinally. Head A comprises or includes a body-member, shell, or casing preferably of any suitable metal stamped or cupped to provide an outer top portion or wall 1, upon which may appear any suitable or desirable design, ornamentation, or the like, and laterally disposed or flanged side-portions or walls 2—2 and end-portions or walls 3—3, both end-portions 3 being cut-away, as at 4, for purposes soon to appear.

Fitting flatwise snugly within the body-member or shell of the head and upon the under or inner face of top-portion 1 thereof, is an inner plate 5 preferably of sheet metal. Provided in plate 5 adjacent its opposite ends and preferably integrally, as by punching or the like, is a pair of oppositely disposed locking-member engaging-springs 6—6, each of said springs obliquely facing toward the longitudinal center of the head and having its free end yieldingly presented outwardly away from said body-member or shell. Intermediate said springs 6, plate 5 is cut-away to provide the preferably rectangular, approximately square, apertures or openings 7—7, as seen particularly in Figs. 6, 8, and 9.

Fitting flatwise upon plate 5 within the confines of the shell or body-member of the head, is a second plate 8 approximately H-shaped in plan view, as seen particularly in Fig. 7, plate 8 being cut-away at its opposite ends to provide a pair of oppositely-disposed approximately U-shaped guide-frames embracing and surrounding the springs 6 of plate 5, as shown in Fig. 8. As seen particularly in Figs. 8 and 9, the legs of said guide-frames are presented outwardly toward the cut-away portions 4 of the shell of the head, the central portion 9 of plate 8, which forms the bight of said frames, lying approximately directly above the central portion 10 of plate 5. As also seen particularly in Figs. 8 and 9, the said guide-frames provided by plate 8 have each a width approximately the same as the width of said cut-away portions 4 of ends 3 of the shell. Also snugly fitting flatwise within the confines of the shell of the head and upon and covering plate 8 with its said guide-frames, is a shell-closing plate or back wall 11, side walls 2 and end walls 3 of the shell being crimped or inturned upon the outer face of plate or wall 11, as clearly seen particularly in Figs. 11 and 21, to rigidly retain the several members 5, 8, and 11 in operative position relatively to the body-member or shell of the head. In proper operative position relatively to springs 6 of the plate 5, outer plate 11 is provided, for purposes shortly appearing, with a pair of suitable perforations 12—12, intermediate with which and in alinement with apertures 7—7 of plate 5, outer plate 11 is cut-away to provide similar preferably rectangular, approximately square, apertures 13—13. Adapted to slidably fit snugly, but removably, within the said guide-frames of the head, are suitable locking-members 14 bent laterally at one end to provide finger-grips, as at 14ª. Within its area, each member 14 is cut-away to provide an enlarged opening or aperture, as at 15, adapted, when locking-member 14 is within the shell of the head, to overlie a spring 6 of plate 5, and to facilitate the removal or withdrawal of locking-member 14 from within the shell of the head, the inner edge of its aperture 15 is recessed, as at 16, thereby also providing corners or shoulders 17 projecting inwardly relatively to aperture 15.

Referring now particularly to Figs. 1 to 5, both inclusive, in which I show a bar cuff-button embodying my invention, 18 indicates the shank of any suitable bar cuff-button body-portion 19. At its free end, shank 18 is provided with a pair of oppositely disposed extensions or, as I will call them, shouldered prongs 20—20 adapted to fit into said registering apertures 13 and 7 of, respectively, plates 11 and 5 of the jewelry-head. At the base of said extensions or prongs 20—20, shank 18 is provided with a suitable enlargement, as at 21, adapted to fit flatwise upon the outer face of outer plate 11 of the shell when the shank is in operative engagement with the jewelry head, as shown, see Figs. 2, 3, and 4, and also 11 and 21.

In use or operation, a shank 18 is fitted to a head A with its prongs 20 projecting into said registering apertures 13 and 7 of the plates 11 and 5 of the head and with its enlargement 21 fitting flatwise upon the outer face of plate 11 of the head. Locking-members 14 are now inserted into said guide-frames of the head and engage with the prongs 20 of shank 18, the head A and shank 18 being thereby operatively locked together, as illustrated in Figs. 2 and 3. On locking-members 14 being so inserted into said guide-frames of the head A, the same first ride upon, and thereby depress, springs 6; the springs 6 afterward, when said locking-members 14 have been fully inserted within said guide-frames, assume their normal position, projecting then obliquely into said apertures or openings 15 and engaging with said corners or shoulders 17 of the locking-members 14, the locking-members 14 being thereby releasably locked in shank-engaging position. When locking-members 14 are in such locked position, the finger-pieces 14ª fit snugly in the cut-away portions 4 of end-walls 3 of the shell and give a finished, neat appearance to the head.

To disengage a shank 18 from a head A, I preferably employ the tool B illustrated in Fig. 27. This tool B is provided at its forward end with a depending flange 22, and projecting outwardly from said flange at preferably the center thereof is a small stud or pin 23. Pin 23 of tool B is adapted to be inserted through a perforation 12 of plate 11 of the head A to depress a spring 6 out of engagement with the shoulders or corners 17 of one of the locking-members 14 to permit the withdrawal or removal of such locking member, as illustrated in Fig. 3. Tool B remaining in its described operative engagement with the head A, the said locking-member 14 cannot be at once entirely withdrawn from the head A, due to the engagement of tool B at its pin 23 with said locking-member; the locking-member, however, may now, due to said recess-continuation 16 of aperture 15 of the locking-member, be moved outwardly relatively to the head A a limited distance depending upon the depth of said recess 16, as illustrated in Fig. 4. The locking-member 14 being so moved outwardly, the shoulders 17 thereof will ride upon the spring 6 and thereby, on tool B being now removed from engagement with the head A, hold the spring 6 in depressed position, whereupon, as will be obvious, the said locking-member 14 may be entirely withdrawn or removed from the head A, as illustrated in Fig. 5. The other locking-member 14 may now be similarly withdrawn or removed from head A, when the shank 18 may be disengaged from the head A, as illustrated also in Fig. 5. It will thus be evident that head A and shank 18, while being readily, easily, and conveniently attachably connected, are, when in operative engagement one with the other through the locking-members 14, firmly and securely locked together and that the same cannot be detachably separated or disengaged except by positive operation on the part of the user.

In Figs. 11 to 24, both inclusive, as illustrating various embodiments of my invention, I have shown various articles of jewelry embodying the same. In Figs. 11, 12, 21, and 22, the body-portion or shank is in the form of a stick-pin 18$^a$. In Figs. 13 to 18, both inclusive, the shank or body-portion is in the form of a ring 18$^b$; in this article an enlargement corresponding to enlargement 21 of shank 18 may be omitted, the ring 18$^b$ being adapted to engage upon the outer plate 11 of the head A, as illustrated in Fig. 16. In Figs. 19 and 20, the shank or body-portion is in the form of a link-chain 18$^c$; in this article the prongs 20$^c$ are, as will be seen, slightly different from the prongs 20 of shank 18, the connecting piece 24 therebetween being adapted, when shank 18$^c$ is in locked engagement with head A, to straddle that portion of plate 11 intermediate its said apertures 13. And in Figs. 23 and 24, the shank or body-portion is in the form of a spring-clasp 18$^d$ having prongs 20$^d$ approximately similar to the prongs 20$^c$ of the cuff-button of Figs. 19 and 20. Otherwise these several forms of my invention, which interchangeably employ the head A as the head thereof, are substantially similar to the form thereof shown in Figs. 1 to 5, both inclusive, and hereinbefore more specifically described.

In Fig. 25, I further show my new jewelry-head as a bracelet-link, a pair A' thereof being detachably connected by a locking member 14' formed of two of said locking-members 14 hingedly attached together at their outer ends, as illustrated particularly in Fig. 26.

It will thus be seen that my new jewelry-head may be conveniently and interchangeably employed as the head for the body-portions of jewelry articles and the like of varying design, in each instance the article presenting an attractive, pleasing, and finished form.

I am aware that changes in the form, construction, arrangement, and combination of the several parts of my new jewelry may be made and substituted for those herein shown and described without departing from the nature and principle of my invention.

Having thus described my invention, what I claim and desire to secure by Letters Patent is:

1. In an article of the kind described, the combination with a head comprising spaced apart top and back walls and side and end walls therebetween and a guide-way intermediate the top and back walls, said back wall having an aperture and an end wall having an opening leading into said guide-way, of a body-member having a shouldered portion adapted to removably fit in said aperture of said back wall and project into said guide-way, a transversely apertured locking-member adapted to slidably fit in said slide-way and engage with said body-portion to detachably fasten said head and body-portion together, and a depressible spring fixed at one end within the head and adapted to normally yieldingly project at its free end into the aperture of, and detachably engage with, said locking-plate to releasably prevent withdrawal of the same from the head, said back-wall provided with a second aperture adapted to receive independent means to depress said spring out of engagement with the locking-member to permit withdrawal of the plate from the head.

2. In an article of the kind described, the combination with a head comprising spaced apart top and back walls and side and end walls therebetween, an inner plate inclosed within said walls, and a plurality of oppositely-disposed guide-ways intermediate said plate and back wall, said end walls having openings leading into said guide ways and said back-wall being provided with a plurality of apertures, of a body-member having a shouldered portion adapted to removably fit in said apertures and project into said guide-ways, apertured plates adapted to slidably fit in said guide-ways and engage said body-portion to detachably fasten the head and body-member together, and depressible springs fixed at one end to said plate and adapted to normally project at their free ends into the apertures of, and detachably engage with, said plates to releasably prevent withdrawal of the plates from the heads, said back wall being provided with additional apertures to receive independent means to depress said springs out of engagement with said plates to permit withdrawal of the plates from the head.

3. In a jewelry article, a laterally flanged shell, a plate fitting within said shell, said plate being provided with a plurality of apertures, a plurality of slideways embraced within the flanges of said shell, a plurality of springs on said plate projecting into said slide-ways, and a cover-plate fixed on said shell and covering said slide-ways and springs, said cover-plate being provided with a plurality of apertures registering with the apertures of said first plate and said shell being cut-away to permit the entrance of separate members into each of said slide-ways.

In testimony whereof, I have signed my name to this specification.

HERMANN H. LOTT.

Copies of this patent may be obtained for five cents each, by addressing the "Commissioner of Patents, Washington, D. C."